United States Patent [19]

Otto et al.

[11] Patent Number: 5,249,514
[45] Date of Patent: Oct. 5, 1993

[54] APPARATUS FOR PRODUCING PUMPABLE FOODSTUFFS, IN PARTICULAR PROCESSED CHEESE

[75] Inventors: Friedrich Otto, Hameln; Albert Dubielzyk, Hessisch Oldendorf, both of Fed. Rep. of Germany

[73] Assignee: A. Stephan und Soehne GmbH & Co., Hameln, Fed. Rep. of Germany

[21] Appl. No.: 15,360

[22] Filed: Feb. 9, 1993

Related U.S. Application Data

[62] Division of Ser. No. 835,339, Feb. 14, 1992.

[30] Foreign Application Priority Data

Feb. 15, 1991 [DE] Fed. Rep. of Germany ....... 4104686

[51] Int. Cl.$^5$ ..................... A23C 19/00; A23P 1/00
[52] U.S. Cl. ......................... 99/454; 99/455; 99/460; 99/466; 99/510; 366/147; 366/168; 366/172; 366/176; 366/295
[58] Field of Search ................. 99/452-455, 99/460, 461, 466, 348, 483, 510; 366/83-86, 101, 102, 107, 144, 147, 167, 168, 172, 173, 176, 292-296, 601; 426/231, 511, 519, 582

[56] References Cited

U.S. PATENT DOCUMENTS

| | | | |
|---|---|---|---|
| 2,074,673 | 3/1937 | Sackett | 366/168 |
| 2,206,419 | 7/1940 | Miller | 99/455 |
| 2,640,033 | 5/1953 | Marshall | 99/460 |
| 3,727,308 | 4/1973 | Ross | 99/460 X |
| 3,859,905 | 1/1975 | Roberts et al. | 99/454 |
| 4,112,131 | 9/1978 | Bosy et al. | 426/582 |
| 4,154,372 | 5/1979 | Ricciardi | 366/295 X |
| 4,155,657 | 5/1979 | King et al. | 366/172 X |
| 4,492,478 | 1/1985 | Ito et al. | 366/168 X |
| 4,610,548 | 9/1986 | Hallet et al. | 366/176 X |
| 4,898,745 | 2/1990 | Zamzow et al. | 426/582 |
| 4,902,523 | 2/1990 | Fritchen et al. | 426/231 |
| 4,924,769 | 5/1990 | Lehmann et al. | 99/455 |

FOREIGN PATENT DOCUMENTS

| | | |
|---|---|---|
| 0005726 | 12/1979 | European Pat. Off. . |
| 586159 | 9/1933 | Fed. Rep. of Germany ...... 366/172 |
| 1278168 | 9/1968 | Fed. Rep. of Germany . |
| 1569083 | 6/1980 | United Kingdom . |

OTHER PUBLICATIONS

F. Kiermeier & G. Weiss, On Technical Influences, Especialy UHT-Sterilisation on Consistency, Emulsion-Stability and Protein Swelling of Processed Cheese., pp. 345-354, Aug. 1972.

Kate Glandorf, Influence of Processes, especialy of UHT treatment on the production of processed cheese and various phosphates. pp. 1020-1026, 1973.

Primary Examiner—Timothy F. Simone
Attorney, Agent, or Firm—Foley & Lardner

[57] ABSTRACT

A process for producing pumpable foodstuffs, wherein raw foodstuffs such as raw cheese is pre-comminuted, mixed with further ingredients, thermally treated by steam injection, subsequently cooled and creamed or emulsified and then fed or passed to a further working or processing operation. The present invention further relates to an apparatus for producing pumpable foodstuffs, such as processed cheese, having a treatment apparatus for raw foodstuffs, a mixer, a device or unit for heating and subsequently cooling the cheese mass and having feed pumps for the cheese mass.

15 Claims, 4 Drawing Sheets

APPARATUS FOR PRODUCING PUMPABLE FOODSTUFFS, IN PARTICULAR PROCESSED CHEESE

This application is a division of application Ser. No. 07/835,339 filed Feb. 14, 1992.

BACKGROUND OF THE INVENTION

The present invention relates to a process for producing pumpable foodstuffs, in particular processed cheese, wherein raw foodstuffs such as raw cheese is pre-comminuted, mixed with further ingredients, thermally treated by steam injection, subsequently cooled and creamed or emulsified and then fed or passed to a further working or processing operation. The present invention further relates to an apparatus for producing pumpable foodstuffs, such as processed cheese, having a treatment apparatus for raw foodstuffs, a mixer, a device or unit for heating and subsequently cooling the cheese mass and having feed pumps for the cheese mass.

Pumpable foodstuffs comprise liquid and viscous foodstuffs, such as for example mild and processed cheese products, soups, sauces, mayonnaises and baby foods and like products However, for the sake of simplicity and brevity, exemplary reference will be made in the specification and claims to cheese, and this reference is intended to include the various different foodstuffs and products as listed above.

SUMMARY OF THE INVENTION

An object of the present invention is to provide a process that satisfies and meets the needs, requirements and criteria for commercial production of pumpable foodstuffs without the shortcomings and disadvantages of prior art processes in a simple, safe and cost-effective manner while allowing the production of any given recipe over prolonged periods of production run time with low operating costs. The present process for producing pumpable foodstuffs may be carried out in batch mode, i.e., discontinuously, or may be conducted continuously. A further object of the present invention is to provide an apparatus suitable for carrying out such a process.

Additional objects and advantages of the invention will be set forth, in part, in the description which follows and, in part, will be obvious from the description, or may be learned by practice of the invention. The objects and advantages of the invention may be realized and attained by means of the elements and combinations particularly pointed out in the appended claims.

To achieve the objects and in accordance with the purpose of the present invention, as embodied and broadly described herein, the process for producing pumpable foodstuffs comprises the steps of a) comminuting and mixing a foodstuff to obtain a uniform, standardized mass of foodstuff, b) heating the uniform, standardized mass of foodstuff to a predetermined temperature by introducing steam and subjecting the mass of foodstuff to a condition of high turbulence, the steam being introduced at a rate such that condensate from the steam gives off substantially all of its heat energy; and c) emulsifying the heated mass of foodstuff. The emulsified, heated mass of foodstuff may be pumped to a temperature-maintaining and reaction chamber before further processing.

The process may further comprise injecting steam in a superpressure range, e.g., up to about 8 bar, into the flowable foodstuff in a flashing unit or zone after emulsifying the heated mass of foodstuff and thereby further heating the emulsified heated mass of foodstuff to a temperature of at least about 150° C. It would also be preferable to subject the mass of foodstuff to a condition of high turbulence in the flashing unit or zone. The mass of foodstuff may be conveyed to a heat-maintaining section after being subjected to steam and high turbulence in the flashing unit or zone.

The process of the present invention may further comprise cooling the emulsified mass of foodstuff in an expansion and creaming unit or zone using a vacuum condensor system. The emulsified mass of foodstuff may be creamed by slowly rotating tools in the expansion and creaming zone. The emulsified mass of foodstuff may be conveyed to a buffer tank after cooling, and from the buffer tank to a filling machine.

It is preferred that a level of vacuum for the vacuum condenser system be set such that an amount of water equal to the amount of water that was injected into the foodstuff as steam in the expansion and creaming zone is removed from the foodstuff.

In another embodiment of the present invention, there is provided an apparatus for producing a pumpable foodstuff comprising a) a treatment unit for comminuting and mixing a foodstuff, b) a mixing and melting unit for mixing and melting foodstuff from the treatment unit and having 1) a mixing chamber within a housing, 2) a mixing and feeding shaft extending into the mixing chamber, the mixing and feeding shaft being operatively connected to a drive unit outside the mixing chamber, 3) a foodstuff intake provided adjacent to the mixing chamber housing, approximately axially in line with the mixing and feeding shaft, and 4) steam injectors opening into or upstream of the mixing chamber in a direction approximately perpendicular to the axis of the mixing and feeding shaft, c) an emulsifying unit adjacent the mixing and melting unit for emulsifying foodstuff from the mixing and melting unit and having 1) an emulsifying chamber within a housing, 2) a set of homogenizing and emulsifying tools, and 3) a processed foodstuff outlet conduit leading out from the emulsifying chamber.

The set of homogenizing and emulsifying tools may include a) a stator arranged fixedly in the emulsifying chamber housing, and b) a rotor enclosed concentrically by the stator without contact, the stator and rotor being arranged axially downstream of the mixing and feeding shaft and rotating together with the mixing and feeding shaft. The stator has axially directed teeth, forming axial slits between them. Preferably, the axial slit between the axially directed teeth of the stator and rotor is between about 0.05 to 10 mm. The mixing and feeding shaft and the rotor may be fastened directly on the drive shaft of the drive unit, and the housing containing the emulsifying chamber may be flange-mounted on the drive unit. The drive unit may be a variable speed drive unit. The apparatus of the present invention may further comprise a flashing unit adjoined to the emulsifying unit. A temperature-maintaining and reaction unit between the emulsifying unit and the flashing unit may also be provided.

The present apparatus may further comprise an expansion and creaming unit having a vacuum-tight expansion and creaming tank and a vacuum-condensor system operatively engaged with the vacuum-tight expansion and creaming tank. Again, a temperature maintaining unit may be provided between the flashing unit and the expansion and creaming unit.

The apparatus of the present invention may further comprise a filling unit adjoining the expansion and creaming unit. The filling unit may include a buffer tank and a filling machine. Once again, a temperature maintaining unit may be provided between the expansion and creaming unit and the filling unit. In order to maintain the vacuum condenser system and the vacuum-tight expansion and creaming tank clean, cleaning lines may be operatively connected to the vacuum-tight expansion and creaming tank.

Such continuously operating processes and apparatuses can be operated in a simple and cost effective manner using currently available automated control technology such as programmable computer controlled machinery and robotic equipment. Thus, the need for permanent, specially trained experts and technicians for the purpose of controlling the production process as well as the need for full-time machine operators is alleviated with the added savings in production costs.

The continuous process according to the present invention is generally preceded by a discontinuous treatment process. When producing processed cheese, the raw material, i.e., raw cheese, is comminuted in a cheese mincer and together with all of the additional ingredients, mixed in a mixing system to yield a homogeneous mix. This mix, not yet thermally treated, has an average particle size between 1 to 4 mm. Mixers which can mix up to 5000 kg per batch are preferred, although a variety of different types of mixers having different load capacities can be used. Samples may be taken after the comminuting step or after the mixing step and analyzed in order to determine whether adjustments need to be made to the ingredient content such as fat and water content to the extent necessary to meet exact content prerequisites, which is of great commercial benefit and facilitates compliance with governmental standards and provisions relating to cheese.

The homogeneous mix is then placed in a chamber and subjected to cooking action by applying heat, preferably in the form of steam, and then immediately subjected to turbulence action. Within a brief moment of time, i.e., few seconds, heat from the steam is transferred to the cheese mass, and the cheese mass becomes heated, for example, to 95° C. The heated cheese mass is then immediately subject to emulsification or creaming action with appropriate machinery and tools that impart high speed rotating action on the cheese mass. A processed cheese which meets strict requirements regarding appearance, gloss, spreadability and texture is thereby obtained.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the present invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
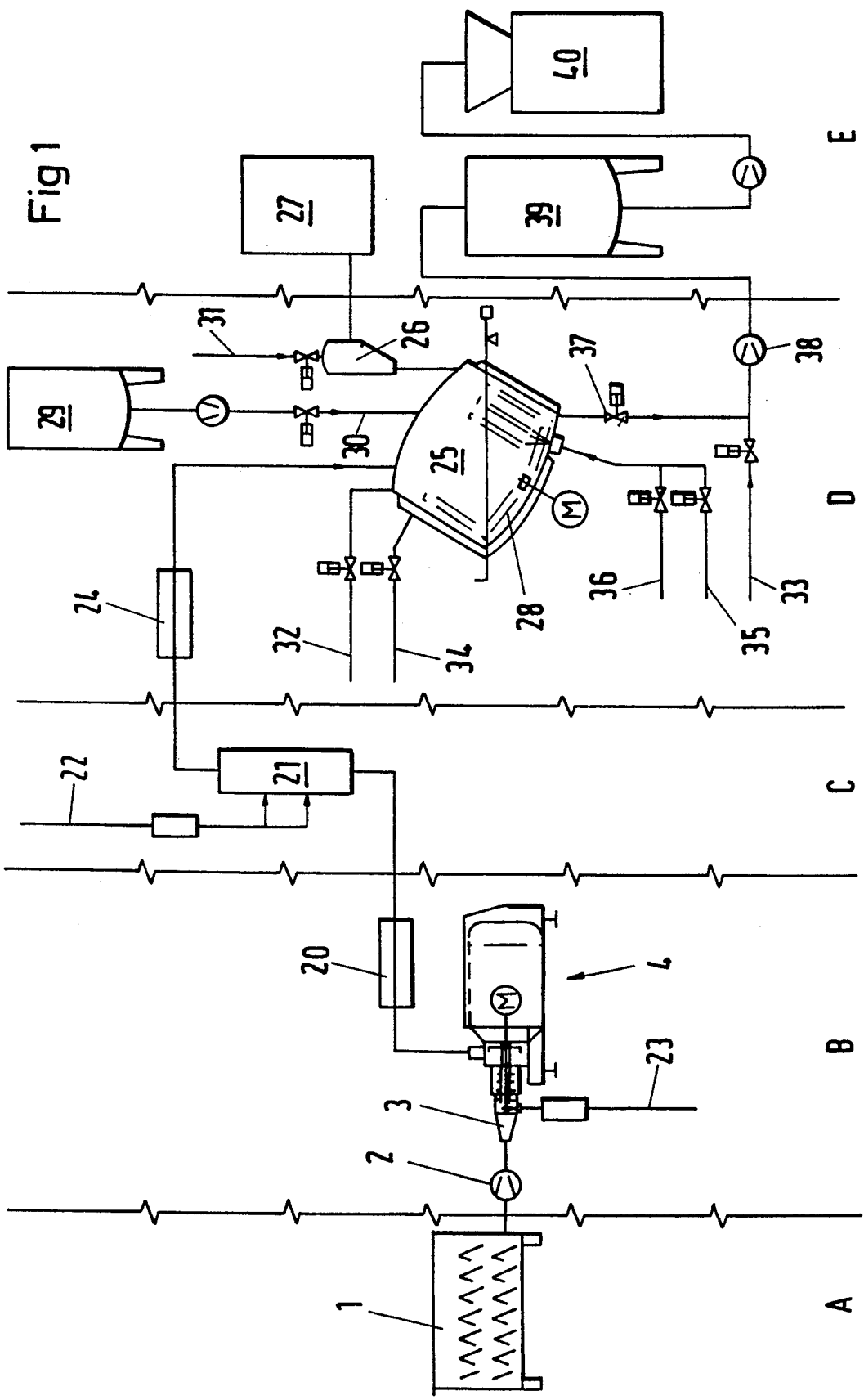
FIG. 1 is a schematic diagram illustrating the process for producing processed cheese.

Referring now to FIG. 1, it can be seen that the process of the present invention may be subdivided into various treatment steps or regions, namely, a mixing region A, a mixing and melting region B, a flashing zone C, an expansion and creaming zone D, and a filling region E.

Foodstuff such as raw cheese, generally in large hunks or pieces, is minced in special cheese mincers to an average particle size of between 1 and 4 mm and then charged using known feeding means into a mixer 1, which is diagrammatically represented in FIG. 1 in the mixing region A. This mincing operation is performed discontinuously or continuously as required, depending on the amount of foodstuff to be processed. While various different types of mixers having different load capacities may be used, a preferred mixer may be an open, doublescrew mixer which is capable of processing up to 5000 kg. of foodstuff, such as cheese, per batch mixing session. In the mixer 1, the minced raw cheese is intimately and homogeneously mixed with any additional ingredients at a mixing temperature of approximately between 15° and 30° C. The cheese mixture is thereafter analyzed, and the fat and water content as well as, perhaps, pH are measured and adjusted as necessary according to set standards and requirements.

The treated, standardized cheese mass is pumped out of the mixer 1 by a dairy pump 2 into the intake 3 of a continuously operating mixing and melting apparatus 4. It is possible to use a frequency-controlled motor in place of the dairy pump drive 2 for automatic control of the feed flow.

Figure 2:
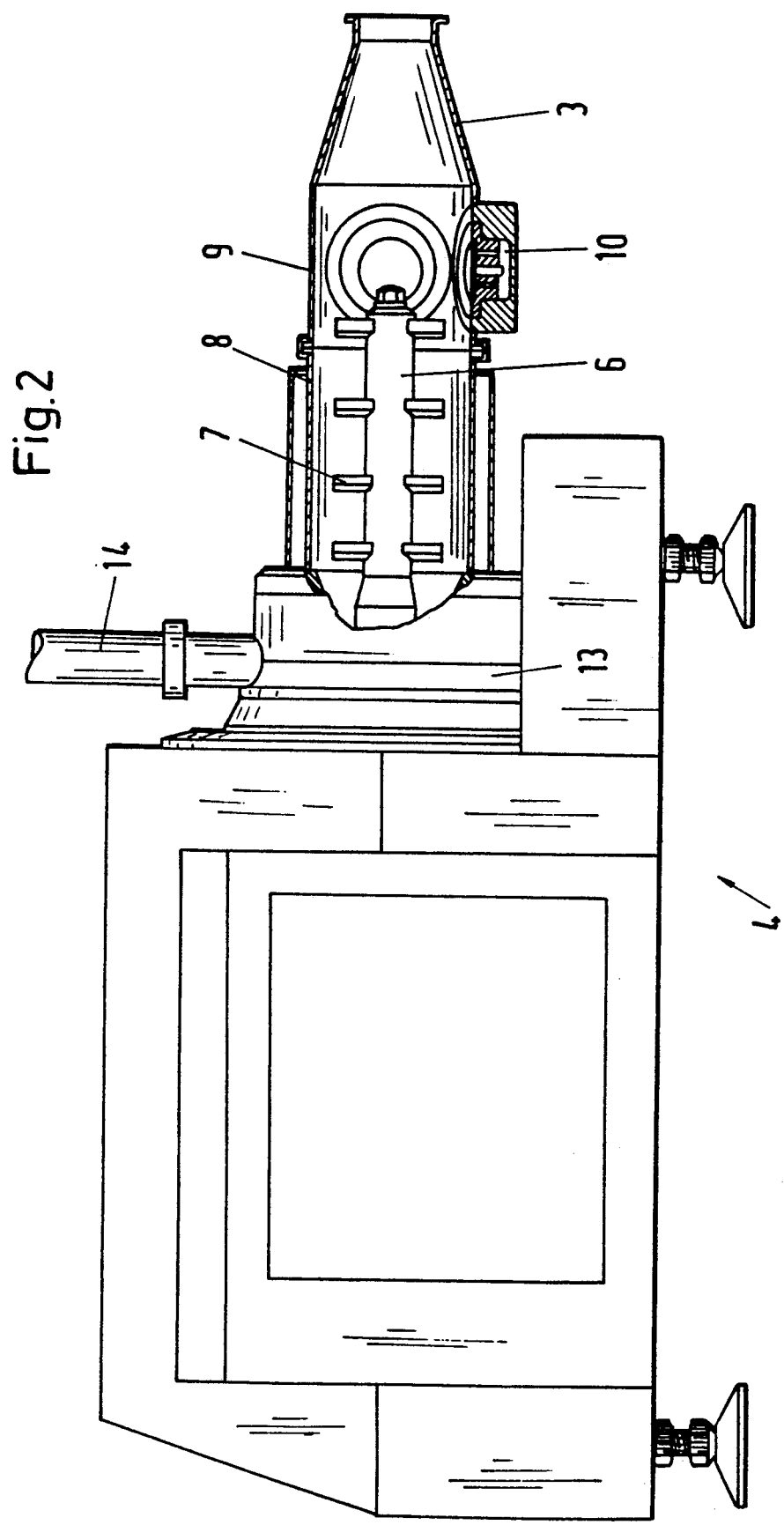
FIG. 2 is an enlarged, side, elevational, part-sectional view of the mixing and melting apparatus as represented in FIG. 1, turned 180° with respect to the latter representation.
Figure 3:
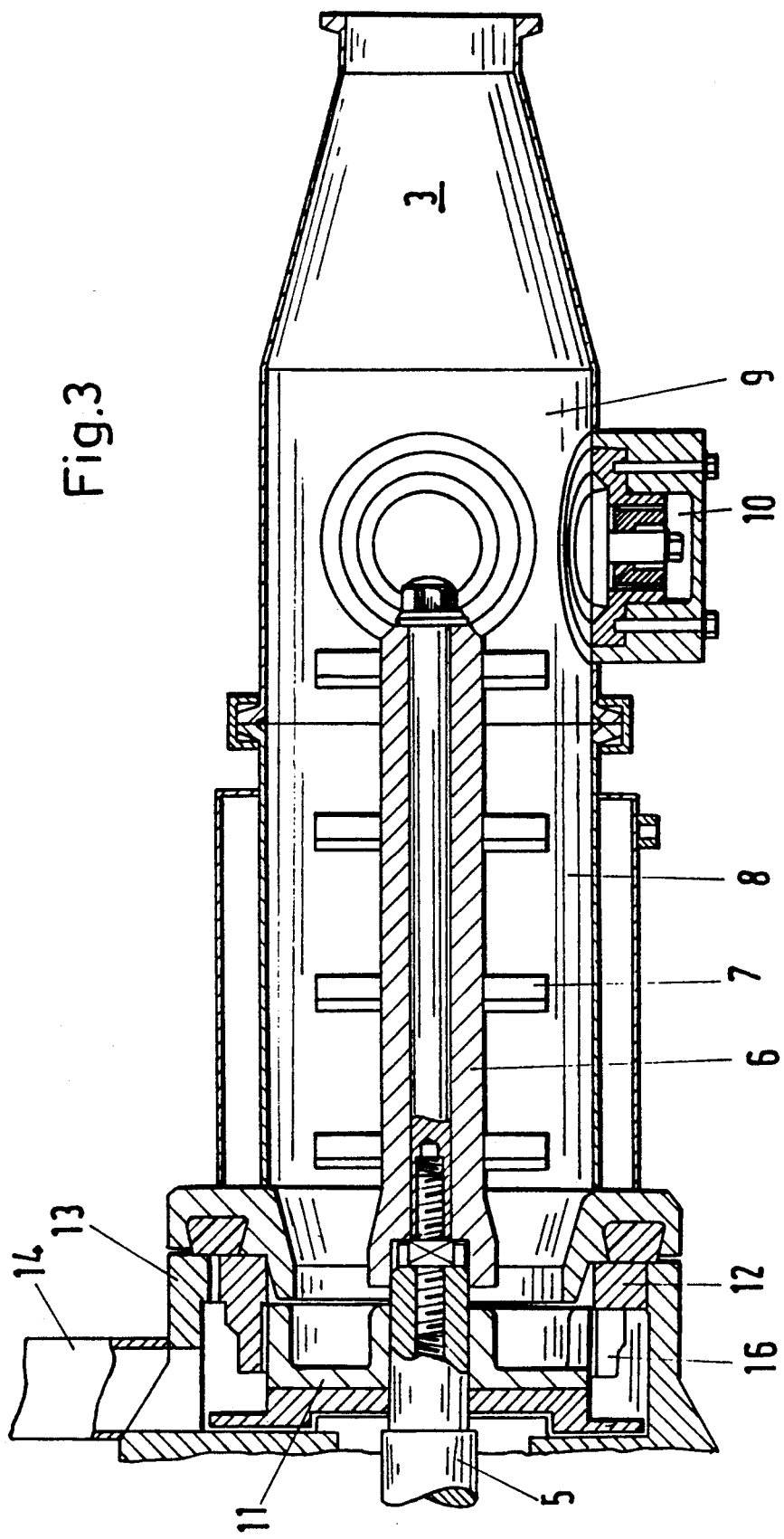
FIG. 3 is an enlarged, side, elevational, schematic diagram showing an intake 3 as shown in FIG. 2.

FIGS. 2 and 3 show the construction of the mixing and melting apparatus 4. The drive of the mixing and melting apparatus can be performed by means of any suitable, commercially available drive unit or motor (not shown in detail). The drive unit is operatively connected to a drive shaft 5 which, in turn, is operatively associated with a mixing and feeding shaft 6. The mixing and feeding shaft 6 is fitted with radially directed mixing tools 7 which, by virtue of an appropriate angle of pitch, impart to the material to be mixed an axial feeding action in the direction of the drive unit. The mixing and feeding shaft 6 rotates within a mixing chamber 8, and as seen in a direction against the product feeding direction, the mixing chamber is adjacent a steam blowing-in zone or steam injection chamber 9 which, in turn, is adjacent an intake chamber 3. The steam may be introduced through steam injectors located on the circumference of the wall of the steam injection chamber 9. The steam injectors may be in the form of nozzles, a steam ring, steam nonreturn valves 10 or the like.

The motor or drive shaft 5 is generally rotated at speeds between 1000 and 4000 rpm. As seen in FIG. 3 and in the product feeding direction, a rotor 11 is integrally mounted on the motor shaft 5 downstream of the mixing and feeding shaft 6 and rotates within a stationary stator 12. An emulsifying unit, comprising the rotor 11 and the stator 12, is arranged and housed in an emulsifying chamber 13. The housing of the emulsifying chamber 13 is flange-mounted directly on the drive unit. A processed cheese outlet tube 14 leads out of the housing of the emulsifying chamber 13 and guides or leads the emulsifying unit 11, 12 downstream in the radial direction.

Figure 4:
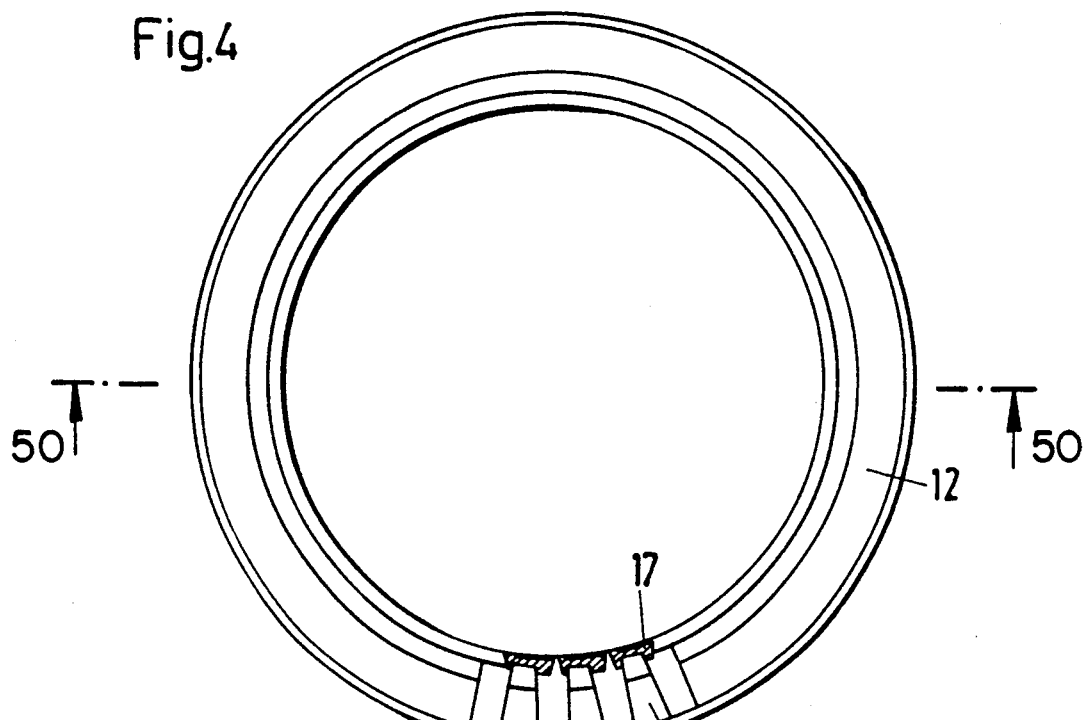
FIG. 4 is a partially cross-sectional, plan view of a stator of the mixing and melting unit or device.
Figure 5:
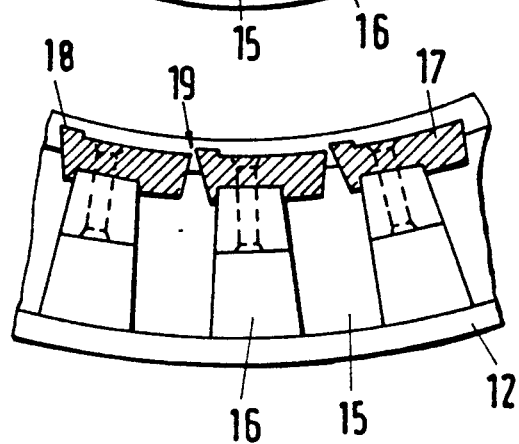
FIG. 5 is an enlarged, detailed representation in section of the stator in FIG. 4.
Figure 6:
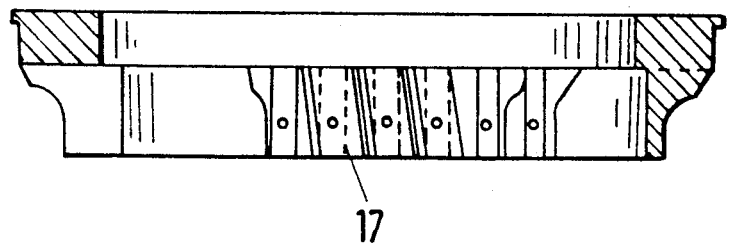
FIG. 6 is a sectional diagram taken along line VI—VI in FIG. 4.

Referring to FIGS. 4 to 6, the stator 12 has axially directed teeth 16, forming axial slits 15 between them. Cutting profiles 17 designed as tips are fastened on the teeth 16. Two axial edges are provided on each cutting profile 17. One axial edge of the cutting profile 17 is designed and adapted as a cutting edge 18, whereas the other axial edge, together with the cutting edge of the following, adjacent cutting profile 17 forms a cutting gap 19. The emulsifying unit may, alternatively be designed according to the form and configuration represented in EP-B1 0 005 726, as incorporated herein by reference.

Steam is introduced and injected into the steam blow-in zone (or steam injection chamber) 9 via steam non-return valves 10. The quality of the steam is of drinking water quality, i.e., potable, and is preferably at a temperature of approximately 140° C. In principle, however, the temperature of the injected steam could also be about 170° C., which higher temperature steam would require a correspondingly greater outlay and investment on apparatus and equipment. The steam injection is preferably performed immediately before the pumped-in raw cheese mass is taken up by the mixing tools 7, rotating at high speed, and subjected to high turbulences in order that the water vapor can give off its energy through condensation to the cheese mass. The result is that the cheese mass is heated in a matter of seconds to a desired temperature of approximately 95° C. In accordance with the invention, the high turbulent conditions are necessary in order to quickly effect transfer of heat energy in the steam to the cheese mass. The steam pressure may in this case be up to 8.0 bar. The rate of steam injection into the steam blowing-in zone or chamber is regulated such that, according to the cheese mass flowing through, the condensate preferably gives off approximately 100% of its energy, so that no free steam is available to escape from the system.

In the case of a continuously operating installation, mixing and feeding shaft 6 and rotorstator system 12 can be varied according to hourly output, recipe and expected quality as well as speed, in order to accomplish different intensities of turbulences and homogenizing effects. For example, the rotor-stator system can, depending on the desired homogenizing intensity, have homogenizing gaps of between approximately 0.05 to 10 mm, preferably between approximately 0.1 and 3 mm. By adjusting the distance of the homogenizing gaps, just as by changing the speed, the shearing forces can be varied. All these factors and possibilities for making changes have a significant influence on the emulsion, the dispersion effect, and, consequently, also directly on the appearance, the gloss, the spreadability and the texture of the cheese mass. With the technology according to the present invention, all physical, thermal and chemical factors acting in the melting process can be matched optimally with one another so that optimal end product results as desired product characteristics can be obtained. Continuously operated heating and emulsifying processes can be controlled by automatic control units or devices in such a way that the quality of the end product is consistently uniform.

According to FIG. 1, the treatment of the cheese mass is followed downstream by a temperature-maintaining and reaction section 20, which is downstream of the processed cheese outlet tube 14 and, depending on the product and the product temperature, permits the choice of a temperature-maintaining time of between about 4 to 180 seconds, for example, not only for spreadable processed cheese products but also for block and sliced cheese.

According to FIG. 1, this temperature-maintaining and reaction section 20 is adjoined by a flashing unit 21, where the processed cheese mass is heated, for example, from about 95° C. to about 140° C., in order to significantly prolong the shelf life of the cheese. The process is performed in the superpressure range by injection of steam via a steam line 22 similar to the steam line 23 connected to the steam non-return valves 10 of the mixing and melting apparatus 4.

Referring to FIG. 1, the flashing unit or zone C is adjoined by the expansion and creaming unit or zone D. After running through a further heat-retaining unit or section 24, the cheese mass, now already referred to as processed cheese, passes into a vacuum-tight expansion and creaming tank 25. A vacuum system 26 as well as a condenser 27 is attached to the expansion and creaming tank 25 for the precipitation of water vapor vacuumed out of the tank 25. Combined, the vacuum system 26 and the condenser 27 form a vacuum condenser system. In the expansion and creaming tank 25, the temperature of the processed cheese, which may be between about 95 and about 140° C., is lowered by a defined vacuum level within a matter of seconds to a desired product or creaming temperature of about 80° C. Vacuum level and product temperature are kept constant by automatic control. Rotatable mixing and creaming tools 28, which can be driven at speeds of between about 5 and about 50 rpm, are provided in the tank 25. The creaming of the processed cheese is improved by the use of these tools. Moreover, additional ingredients can be added in this way so as to be mixed into the processed cheese mass. For this purpose, an ingredients tank 29 as well as a supply line 30, which is fitted with a pump and shut-off valve and which opens out into a suction intake opening of the tank 25, are indicated in FIG. 1.

The expansion and creaming tank 25 is mounted on weighing cells, by means of which the amounts of pre-cooked cheese and the filling level of the tanks can be constantly monitored and exactly determined during production. For example, the filling level which corresponds to a certain weight can be visually indicated on a display on the switch cabinet.

In order to be able to carry out a cleaning of the expansion and creaming tank 25 as well as of the vacuum tank of the vacuum system 26 continuously during the process, three cleaning lines 31, 32 and 33, each fitted with shut-off valves, are connected to the tank 25. The expansion and creaming tank 25 is consequently able to meet stringent hygienic and aseptic requirements with regard to its housing and its internal fittings. This means, inter alia, that dead spaces, in which residues can be deposited, are avoided. No slotted screws which could come into contact with the product may be used. The gaps of all shaft glands are cleaned directly.

According to FIG. 1, water lines 34, 35 and a steam line 36 are also connected to the expansion and creaming tank 25. Moreover, the tank 25 has a bottom seat valve 37 for continuously pumping off the ready, produced and subsequently creamed processed cheese. The feeding of the ready, produced and subsequently creamed processed cheese is performed continuously, for example, by means of a gear pump 38, into a buffer tank 39 and from there into a filling machine 40.

It will be apparent to those skilled in the art that various modifications and variations can be made in the process of the present invention and in the construction of this apparatus without departing from the scope or spirit of the invention.

Other embodiments of the invention will be apparent to those skilled in the art from consideration of the specification and practice of the invention disclosed herein. It is intended that the specification and examples be considered as exemplary only, with true scope and spirit of the invention being indicated by the following claims.

What is claimed is:

1. An apparatus for producing a pumpable foodstuff comprising:
   a) a treatment unit for comminuting and mixing a foodstuff;
   b) a mixing and melting unit for mixing and melting foodstuff from the treatment unit and having
      1) a mixing chamber within a housing;
      2) a mixing and feeding shaft extending into the mixing chamber, the mixing and feeding shaft being operatively connected to a drive unit outside the mixing chamber;
      3) a foodstuff intake provided adjacent to the mixing chamber housing, approximately axially in line with the mixing and feeding shaft; and
      4) steam injectors opening into or upstream of the mixing chamber in a direction approximately perpendicular to the axis of the mixing and feeding shaft;
   c) an emulsifying unit adjacent to the mixing and melting unit for emulsifying the foodstuff from the mixing and melting unit and having
      1) an emulsifying chamber within a housing;
      2) a set of homogenizing and emulsifying tools; and
      3) a processed foodstuff outlet conduit leading out from the emulsifying chamber.

2. An apparatus as claimed in claim 1, wherein the s and emulsifying tools includes:
   a) a stator arranged fixedly in the emulsifying chamber housing; and
   b) a rotor enclosed concentrically by said stator without contact,
the stator and rotor being arranged axially downstream of the mixing and feeding shaft and rotating together with the mixing and feeding shaft.

3. An apparatus as claimed in claim 2, wherein the stator has axially directed teeth, forming axial slits between them.

4. An apparatus as claimed in claim 3, wherein the axial slits between the axially directed teeth of the stator and rotor is between about 0.05 to 10 mm 5. An apparatus as claimed in claim 3, wherein the axial slits between the axially directed teeth of the stator and rotor is between about 0.1 to 3 mm.

6. An apparatus as claimed in claim 2, wherein the mixing and feeding shaft and the rotor are fastened directly on the drive shaft of the drive unit, and the housing containing the emulsifying chamber is flange-mounted on the drive unit.

7. An apparatus as claimed in claim 1, wherein the drive unit is a variable speed drive unit.

8. An apparatus as claimed in claim 1, further comprising a flashing unit adjoined to the emulsifying unit.

9. An apparatus as claimed in claim 8, further comprising a temperature-maintaining and reaction unit between the emulsifying unit and the flashing unit.

10. An apparatus as claimed in claim 8, further comprising an expansion and creaming unit having a vacuum-tight expansion and creaming tank and a vacuum-condenser system operatively engaged with the vacuum-tight expansion and creaming tank.

11. An apparatus as claimed in claim 10, further comprising a temperature-maintaining unit between the flashing unit and the expansion and creaming unit.

12. An apparatus as claimed in claim 10, further comprising a filling unit adjoining the expansion and creaming unit.

13. An apparatus as claimed in claim 12, wherein the filling unit includes a buffer tank and a filling machine 14. An apparatus as claimed in claim 12, further comprising a temperature-maintaining unit between the expansion and creaming unit and the filling unit.

15. An apparatus as claimed in claim 10, further comprising cleaning lines operatively associated with the vacuum-tight expansion and creaming tank.

* * * * *